(12) United States Patent
Morishita et al.

(10) Patent No.: US 6,617,813 B2
(45) Date of Patent: Sep. 9, 2003

(54) WIPER CONTROL SYSTEM AND METHOD FOR CONTROLLING WIPER

(75) Inventors: Taiji Morishita, Toyota (JP); Masao Tokunaga, Gamagori (JP)

(73) Assignees: Denso Corporation, Kariya (JP); Nippon Soken, Inc., Nishio (JP)

(*) Notice: Subject to any disclaimer, the term of this patent is extended or adjusted under 35 U.S.C. 154(b) by 0 days.

(21) Appl. No.: 10/212,754

(22) Filed: Aug. 7, 2002

(65) Prior Publication Data

US 2003/0030393 A1 Feb. 13, 2003

(30) Foreign Application Priority Data

Aug. 9, 2001 (JP) ........................................ 2001-242811

(51) Int. Cl.⁷ .................................................. B60S 1/08
(52) U.S. Cl. ........................ 318/444; 318/443; 318/483; 318/DIG. 2; 307/9.1; 15/250.19
(58) Field of Search ................................. 318/443, 444, 318/DIG. 2, 483; 307/9.1; 15/250.19; 701/36

(56) References Cited

U.S. PATENT DOCUMENTS 5,216,341 A * 6/1993 Nomura et al. ............. 318/444
6,219,598 B1 * 4/2001 Miwa et al. ................... 701/36

FOREIGN PATENT DOCUMENTS

| JP | 404339050 A | * 11/1992 | ............. B60S/1/08 |
| JP | 404339051 A | * 11/1992 | ............. B60S/1/08 |
| JP | 11-5514 | 1/1999 | |

* cited by examiner

*Primary Examiner*—Rita Leykin
(74) *Attorney, Agent, or Firm*—Nixon & Vanderhye P.C.

(57) ABSTRACT

A raindrop sensor detects an amount of raindrops landed on a window glass and outputs a measurement signal to a microcomputer. The microcomputer calculates an average amount of raindrops by averaging a predetermined number of the latest measurements. The microcomputer calculates an interval time for the wiper based on the calculated average amount of raindrops. At this time, when the calculated average amount of raindrops deviates from a predetermined reference value, the microcomputer calculates the average amount of raindrops using a smaller number of the latest measurements.

14 Claims, 4 Drawing Sheets

WIPER CONTROL SYSTEM AND METHOD FOR CONTROLLING WIPER

CROSS REFERENCE TO RELATED APPLICATION

This application is based on and incorporates herein by reference Japanese Patent Application No. 2001-242811 filed on Aug. 9, 2001.

BACKGROUND OF THE INVENTION

1. Field of the Invention

The present invention relates to a wiper control system for automatically wiping off raindrops landed on a window glass of an automotive vehicle, a ship, an airplane or the like, and particularly to a wiper control system for sensing an amount of raindrops with a raindrop sensor and controlling the operation of wipers based on the measured amount of raindrops.

2. Description of Related Art

One type of such a wiper control system of a vehicle optically measures an amount of raindrops landed on a window glass during each wiping period of wipers with a raindrop sensor. Then, the wiper control system controls a wiping speed or movement of the wipers based on the measured amount of raindrops.

In such a wiper control system, even if an actual rainfall does not change substantially from one wiping period to the next wiping period, the amount of raindrops measured with the raindrop sensor may substantially change from one wiping period to the next wiping period due to, for example, a change in a direction of wind applied to the window glass of the running vehicle. The substantial change in the measured amount of raindrops from one wiping period to the next wiping period normally results in a change or fluctuation in the wiping speed of the wipers from one wiping period to the next wiping period, which is annoying to occupants of the vehicle.

SUMMARY OF THE INVENTION

The present invention addresses the above disadvantage. Thus, it is an objective of the present invention to provide a wiper control system, which can conduct more stable wiping operation of a wiper(s) in correspondence with an amount of raindrops landed on a window glass. It is another objective of the present invention to provide a method for controlling a wiper(s) in more stable manner in correspondence with an amount of raindrops landed on a window glass.

To achieve the objectives of the present invention, there is provided a wiper control system including a wiper for wiping off raindrops landed on a window glass, a sensing means for taking a measurement of an amount of raindrops present in a predetermined area of the window glass at a predetermined time in each wiping period of the wiper, an average amount calculating means for calculating an average amount of raindrops in each wiping period of the wiper by averaging a predetermined number of the latest measurements measured with the sensing means, and a wiper control means for controlling operation of the wiper based on the average amount of raindrops, which is calculated by the average amount calculating means. The sensing means is disposed in a wiping range of the wiper on the window glass.

To achieve the objectives of the present invention, there is also provided a method for controlling a wiper, which wipes off raindrops landed on a window glass. According to the method, a measurement of an amount of raindrops present in a predetermined area of the window glass is taken at a predetermined time in each wiping period of the wiper. Then, an average amount of raindrops is calculated in each wiping period of the wiper by averaging a predetermined number of the latest measurements. Thereafter, operation of the wiper is controlled based on the average amount of raindrops.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
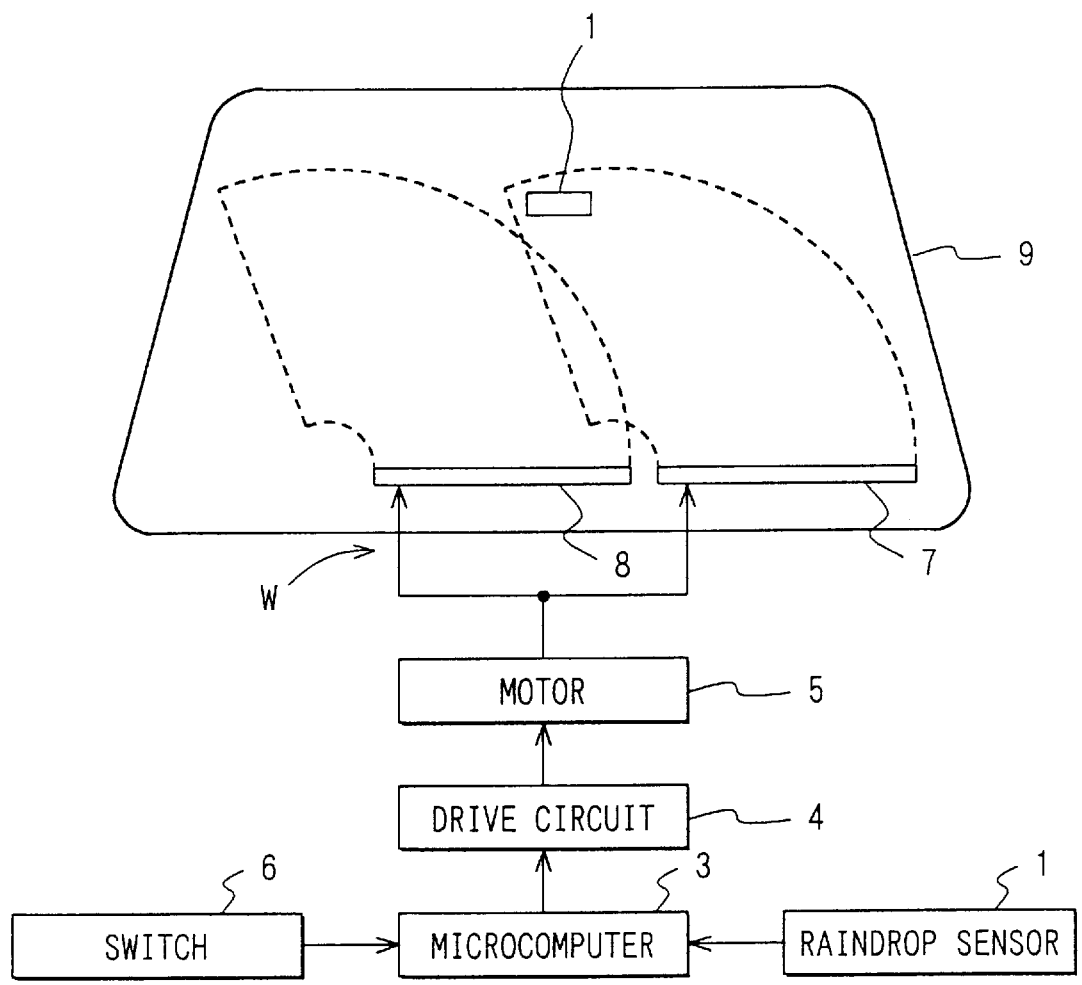
FIG. 1 is a block diagram showing a wiper control system according to a first embodiment of the present invention.

A first embodiment of the invention will now be described with reference to the accompanying drawings. FIG. 1 is a schematic view illustrating a wiper control system for a vehicle according to the first embodiment. The wiper control system has a raindrop sensor 1 attached to a window glass 9 of the vehicle in a wiping range of one of wipers W. The raindrop sensor 1 acts as a sensing means for taking a measurement of an amount of raindrops present in a predetermined area of the window glass 9 at a predetermined time in each wiping period of the corresponding wiper W. The raindrop sensor 1 outputs a corresponding measurement signal indicating a measured amount of raindrops.

The raindrop sensor 1 includes an optical system and a detection/calculation circuit received in a small case. The optical system includes a light-emitting device for emitting, for example, infrared light, a light-receiving device for receiving infra-red light, a prism and converging lenses. Light emitted from the light-emitting device is directed to the window glass 9 through one converging lens and the prism and is then reflected by the window glass 9. The reflected light then passes the prism and another converging lens and is received by the light-receiving device. When there are no raindrops on the outer surface of the window glass 9, light incident on the face of the glass is almost all reflected and received by the light-receiving device. However, when there are raindrops on the outer surface of the window glass 9, these raindrops cause full reflection to be lost and the amount of light received by the light-receiving device falls correspondingly based on the amount of raindrops. The output signal of the light-receiving device, which falls along with the amount of raindrops, is fed as a measurement signal indicating the amount of raindrops to a microcomputer 3 for wiper control.

The wipers W have driver side and passenger side wiper blades 7, 8. The wiper blades 7, 8 are oscillated by a wiper motor 5, so that the wiper blades 7, 8 wipe fan-shaped areas of window glass face on the driver side and the passenger side. The wiper motor 5 is driven at a low speed or at a high speed or intermittently by a motor drive circuit 4. Switching among these and a delay time interval of intermittent operation, particularly in an automatic mode, are controlled by a wiper switch 6 and the microcomputer 3. The wiper switch 6 is a switch operated by a driver. The driver manually switches the wiper switch 6 among the automatic mode, the low speed operation mode and the high speed operation mode and also adjusts sensitivity through the wiper switch 6. In this embodiment, when this wiper switch 6 is switched to the automatic mode, the microcomputer 3 executes automatic control of the wipers W.

At a predetermined time after completion of swing wiping movement of the corresponding wiper W, the microcomputer 3 samples the measurement signal from the raindrop sensor 1 and obtains the measured amount of raindrops based on the measurement signal. More specifically, the measurement signal of the raindrop sensor 1 is sampled at an end of each OFF period (indicated with OFF in FIG. 3), i.e., at an end of the delay time interval of the corresponding wiper W. Here, the delay time interval of the wiper refers to a time interval between an end of one swing wiping motion of the wiper to a beginning of the next swing wiping motion of the wiper. Furthermore, it should be noted that even when the wipers W are operated at the high speed or low speed, a short delay time interval is present. In the case of the high speed operation of the wipers, the delay time interval can be, for example, about 0.2–0.3 seconds. In the case of the low speed operation of the wipers, the delay time interval can be, for example, about 0.4–0.5 seconds. Thus, the measurement signal of the raindrop sensor 1 can be sampled at the end of the delay time interval in each of the high speed operation, the low speed operation and the intermittent operation of the wipers W. Then, the microcomputer 3 stores each sampled data or each measurement (i.e., each measured amount of raindrops) in a RAM sequentially. Thereafter, the microcomputer 3 calculates a moving average of a predetermined number of the latest measurements (hereinafter, this average will be simply referred to as an average amount of raindrops) in each wiping period of the corresponding wiper. Since this average amount of raindrops is the moving average amount of raindrops, the most recent measurement is included in the predetermined number of the latest measurements, and a sum of these latest measurements is divided by the predetermined number of the latest measurements to obtain the moving average amount of raindrops.

Figure 3:
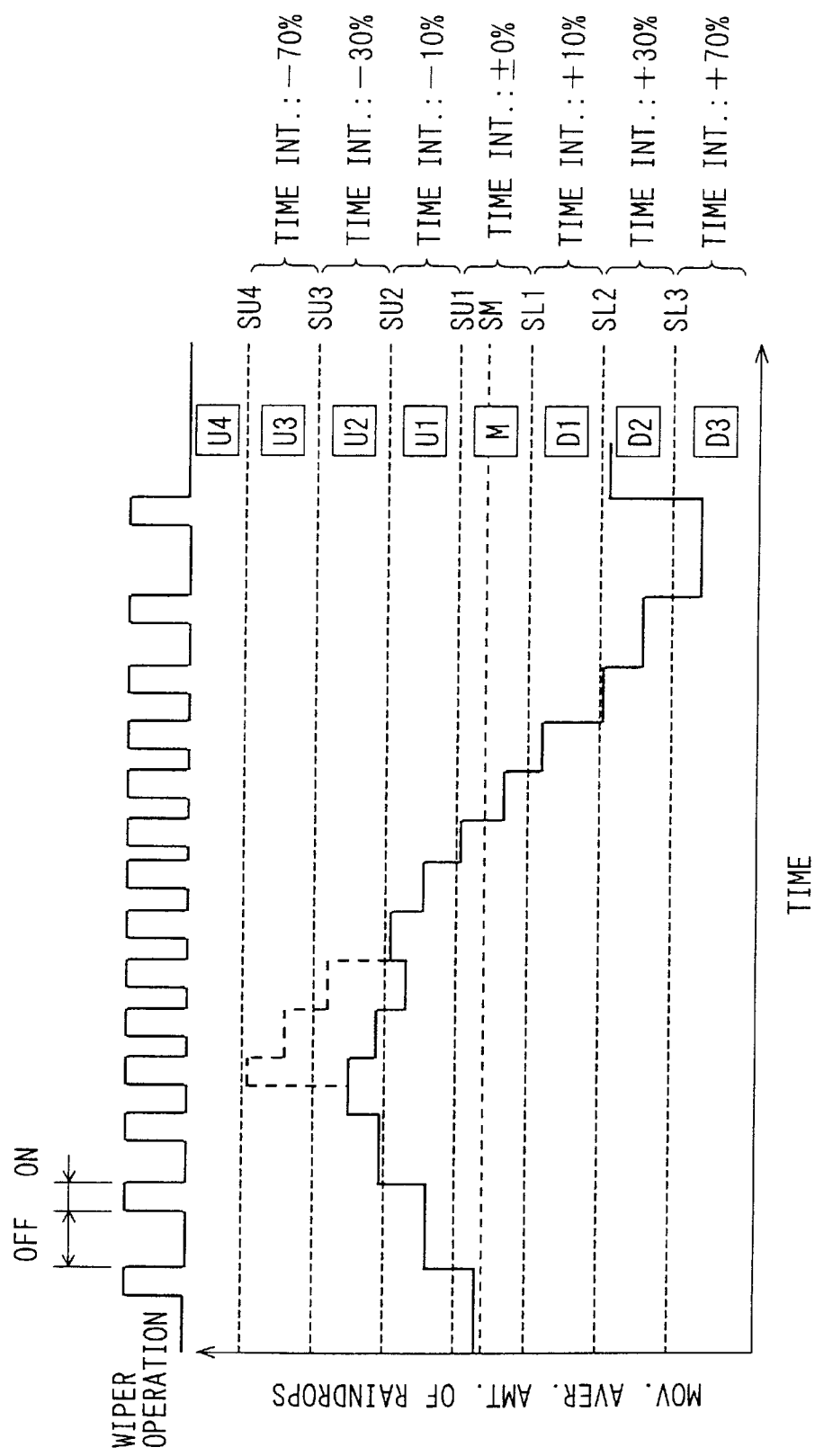
FIG. 3 is a graph showing a change in a moving average amount of raindrops with respect to time.

With reference to a graph of FIG. 3, this average amount of raindrops is then compared with a plurality of predetermined limit values. Then, based on the result of this comparison, a next delay time interval of the wipers is calculated. The number of the latest measurements to be used for calculating the average amount of raindrops in the next wiping period is determined based on the current average amount of raindrops.

As shown in the graph of FIG. 3, in order to process the calculated moving average amount of raindrops, a reference value (predetermined reference average amount of raindrops) SM, which serves as a reference for control, is first set at an approximately central level in a measurable range of the moving average amount. Then, first to fourth upper limit values SU1–SU4 are set above the reference value SM at predetermined intervals, and first to third lower limit values SL1–SL3 are set below the reference value SM at predetermined intervals, as shown in FIG. 3.

A region between the first upper limit value SU1 and the first lower limit value SL1 includes the reference value SM and is referred to as a base region M (more specifically, SL1<M<SU1). In the base region M, a delay time interval adjustment value for adjusting the next delay time interval by applying it to the current delay time interval is set to 0%. A region between the first upper limit value SU1 and the second upper limit value SU2 is referred as a first upper region U1 (more specifically, SU1≦U1<SU2) where the delay time interval adjustment value is set to –10%. A region between the second upper limit value SU2 and the third upper limit value SU3 is referred to as a second upper region U2 (more specifically, SU2≦U2<SU3) where the delay time interval adjustment value is set to –30%. A region between the third upper limit value SU3 and the fourth upper limit value SU4 is referred to as a third upper region U3 (more specifically, SU3≦U3<SU4) where the delay time interval adjustment value is set to –70%. A region equal to or above the fourth upper limit value SU4 is referred to as a fourth upper region U4 (more specifically, SU4≦U4) where the wipers are operated continuously at the high speed.

Furthermore, a region between the first lower limit value SL1 and the second lower limit value SL2 is referred to as a first lower region D1 (more specifically, SL2<D1≦SL1) where the delay time interval adjustment value is set to +10%. A region between the second lower limit value SL2 and the third lower limit value SL3 is referred to as a second lower region D2 (more specifically, SL3<D2≦SL2) where the delay time interval adjustment value is set to +30%. A region between the third lower limit value SL3 and zero is a third lower region D3 (more specifically, 0<D3≦SL3) where the delay time interval adjustment value is set to +70%.

Also, in the base region M, the predetermined number of the latest measurements, which is used in the averaging calculation of the moving average amount of raindrops, is set to 16. In the first and second upper regions U1, U2, the predetermined number of the latest measurements is set to 8. In the third and fourth upper regions U3, U4, the predetermined number of the latest measurements is set to 4. In the first and second lower regions D1, D2, the predetermined number of the latest measurements is set to 8. In the third lower region D3 and the region below the third region D3 (i.e., the region where the amount of raindrops is substantially zero), the predetermined number of the latest measurements is set to 4.

Figure 2:
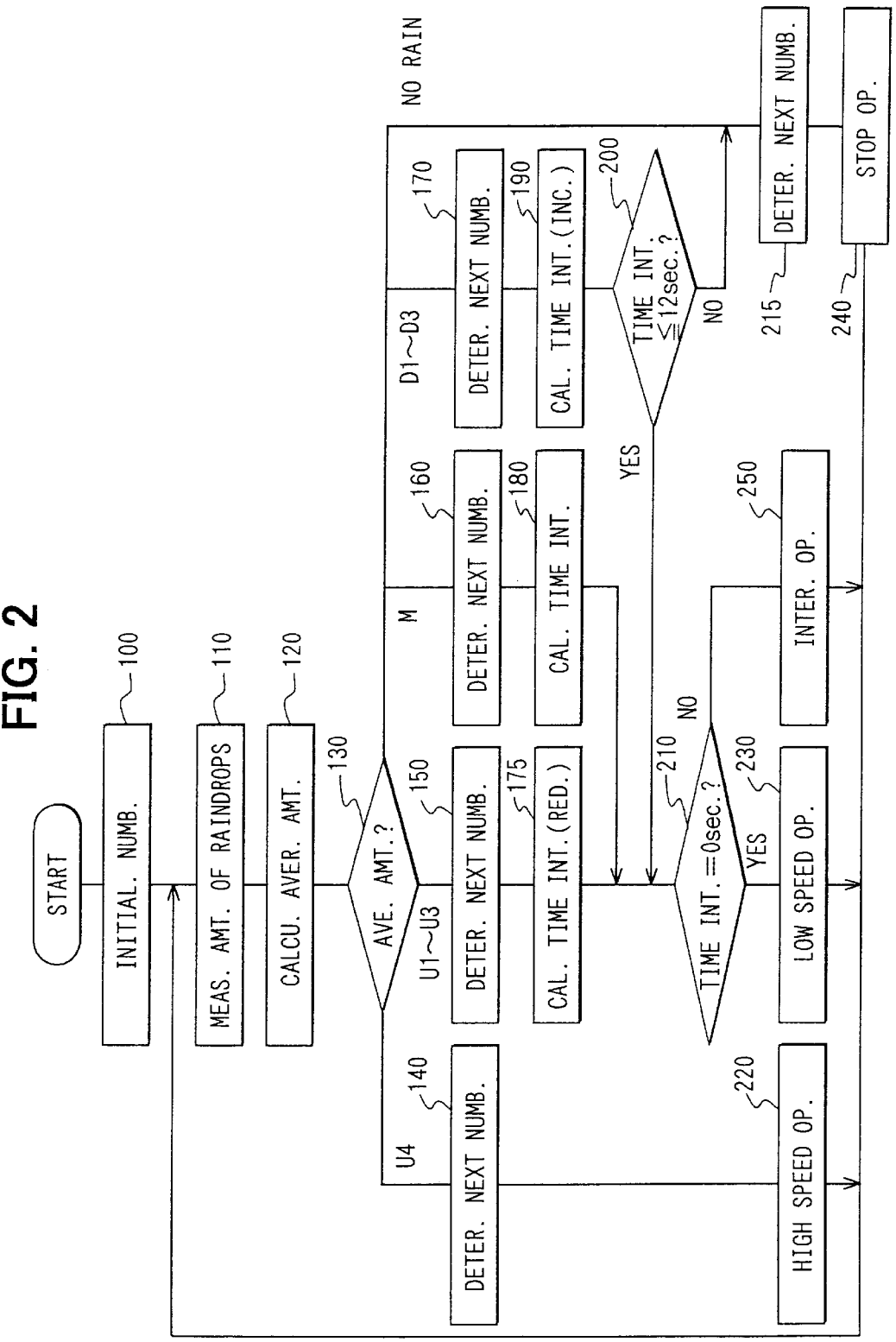
FIG. 2 is a flow chart showing operation of the wiper control system according to the first embodiment.

Next, the operation of the wiper control system will be explained with reference to a flow chart of FIG. 2. In the following description, it is assumed that the wiper switch 6 is set to the automatic operation mode. First, at step 100, the microcomputer 3 initializes the number of the latest measurements stored in a memory. Then, at step 110, the microcomputer 3 samples the measurement signal from the raindrop sensor 1 and stores the corresponding sampled data or measurement (i.e., the measured amount of raindrops). For example, when the wipers W are operated, the microcomputer 3 samples the measurement signal and stores sampled data (i.e., the measured amount of raindrops) at the predetermined time after each complete swing wiping movement of the corresponding wiper W.

Then, at step 120, the current moving average amount of raindrops is calculated by averaging the predetermined number of the latest measurements. The predetermined number of the latest measurements used in the current wiping period is determined as described above based on the previous moving average amount of raindrops. Then, these latest measurements are summed, and then the sum is divided by the predetermined number of the latest measurements, which is determined based on the previous moving average amount of raindrops.

Then, at step 130, it is determined where the current moving average amount of raindrops falls.

For example, when the current moving average amount of raindrops falls in the base region M of the graph in FIG. 3, control proceeds from step 130 to step 160. At step 160, the predetermined number of the latest measurements is set to 16 that is the maximum predetermined number of the latest measurements. Then, control proceeds to step 180 where the delay time interval is calculated using the delay time interval adjustment value of 0%. Thereafter, control proceeds from step 180 to step 210, which will be described later.

When the current moving average amount of raindrops is increased and thus falls in one of the first to third upper regions U1–U3, control proceeds from step 130 to step 150. At step 150, when the current moving average amount of raindrops is in one of the first and second upper regions U1, U2, the number of the latest measurements for the averaging calculation is set to 8. Also, at step 150, when the current moving average amount of raindrops is in the third upper region U3, the number of the latest measurements for the averaging calculation is set to 4. Thereafter, control proceeds from step 150 to step 175. At step 175, a delay time interval for intermittent operation is calculated. When the current moving average amount of raindrops is in the first upper region U1, the delay time interval adjustment value of –10% is used for the calculation. When the current moving average amount of raindrops is in the second upper region U2, the delay time interval adjustment value of –30% is used for the calculation. When the current moving average amount of raindrops is in the third upper region U3, the delay time interval adjustment value of –70% is used to calculate the delay time interval. Then, control proceeds from step 175 to step 210, which will be described later.

When the current moving average amount of raindrops is further increased and thus falls in the fourth upper region U4, control proceeds from step 130 to step 140 where the number of the latest measurements is set to 4. Then, control proceeds from step 140 to step 220 where the wipers W are driven at the high speed, and control returns to step 110.

When the current moving average amount of raindrops is determined to be substantially zero, control proceeds from step 130 to step 215. At step 215, the number of the latest measurements to be used in the next averaging calculation is set to 4, which is the minimum predetermined number of the latest measurements. Then, control proceeds from step 215 to step 240 where the wipers W are stopped, and control returns to step 110.

When the current moving average amount of raindrops falls in one of the first to third lower regions D1–D3, control proceeds from step 130 to step 170. At step 170, when the current moving average amount of raindrops is in one of the first and second lower regions D1, D2, the number of the latest measurements for the averaging calculation is set to 8. Also, at step 170, when the current moving average amount of raindrops is in the third lower region D3, the number of the latest measurements for the averaging calculation is set to 4. After the number of the latest measurements is set at step 170, control proceeds to step 190. At step 190, a delay time interval for intermittent operation is calculated. When the current moving average amount of raindrops is in the first lower region D1, +10% is used as the delay time interval adjustment value to lengthen or increase the delay time interval. When the current moving average amount of raindrops is in the second lower region D2, the delay time interval adjustment value of +30% is used for the calculation. When the current moving average amount of raindrops is in the third lower region D3, the delay time interval adjustment value of +70% is used to calculate the delay time interval. Here, steps 120–170 constitute an average amount calculating means of the present invention for calculating an average amount of raindrops in each wiping period of the wiper W. Furthermore, steps 175, 180, 190 constitute a delay time interval calculating means of the present invention for calculating a next delay time interval of the wiper based on the current calculated average amount of raindrops.

After the calculation of the delay time interval at step 190, control proceeds to step 200. At step 200, it is determined whether the calculated delay time interval that is calculated at step 190 is equal to or less than 12 seconds, which is the maximum delay time interval. When NO is returned at step 200, control proceeds to step 215. At step 215, the number of the latest measurements to be used in the next averaging calculation is set to 4, which is the minimum predetermined number of the latest measurements. Then, control proceeds from step 215 to step 240 where the wipers W are stopped, and control returns to step 110. On the other hand, when YES is returned at step 200, control proceeds to step 210.

At step 210, it is determined whether the delay time interval calculated at any one of steps 175, 180, 190 is equal to substantially zero second (here, the substantially zero second means, for example, less than 1 second, preferably equal to or less than about 0.1 second). When YES is returned at step 210, control proceeds to step 230 where the wipers W are operated at the low speed, and control returns to step 110. On the other hand, when No is returned at step 210, control proceeds to step 250 where the wipers W are intermittently operated using the calculated delay time interval, which is calculated at the corresponding one of steps 175, 180, 190, and control returns to step 110. Here, steps 220–250 constitute a wiper control means for controlling operation of the wiper W based on the average amount of raindrops.

As described above, since the predetermined number of the latest measurements is averaged, and the average amount of raindrops is used to control the wipers, the fluctuation of the operation of the wipers W from one wiping period to the next wiping period is further restrained to achieve more stable operation of the wipers.

Furthermore, when the moving average amount of raindrops is determined to fall in one of the first to third upper regions U1–U3 above the reference value SM by repeating steps 110 to 240 in the above described manner, the microcomputer 3 performs the control operation in the following manner. That is, with reference to FIG. 3, if the moving average amount of raindrops increases from the first upper region U1 to the second upper region U2 and then to the third upper region U3, the delay time interval adjustment value is reduced from –10% to –30% and then to –70% to reduce the delay time interval of the wipers W in the intermittent operation. Such operation of the wipers, which accompanies this shortening of the delay time interval, causes the amount of raindrops on the window glass surface measured in each wiping period to decrease, and thus the moving average amount of raindrops also gradually falls and approaches the reference value SM.

Similarly, as described above, when the moving average amount of raindrops is determined to fall in one of the first to third lower regions D1–D3 below the reference value SM, the microcomputer 3 performs the control operation in the following manner. That is, with reference to FIG. 3, if the moving average amount of raindrops decreases from the first lower region D1 to the second lower region D2 and then to the third lower region D3, the delay time interval adjustment value is increased from +10% to +30% and then to +70% to increase the delay time interval of the wipers W in the intermittent operation. Such operation of the wipers causes the amount of raindrops on the window glass surface measured in each wiping period to increase, and thus the moving average amount of raindrops also gradually increases and approaches the reference value SM. Accordingly, in the driving of the wipers W, the moving average amount of raindrops calculated in each wiping period is controlled to approach the reference value SM, where the delay time interval adjustment value is 0%, and consequently stable wiping operation can be carried out.

Also, as shown in the graph of FIG. 3, the further the moving average amount of raindrops moves from the reference value SM into the region thereabove or therebelow, the predetermined number of the latest measurements for the next averaging calculation becomes smaller (i.e., from 16 to 8 and then 4). Consequently, when the rain suddenly becomes hard, and thus the amount of raindrops suddenly increases to cause a large increase in the calculated moving average amount of raindrops, or when the vehicle has entered a tunnel and thus the amount of raindrops suddenly decreases, control can be carried out to match the delay time interval rapidly to the current amount of raindrops.

Figure 4:
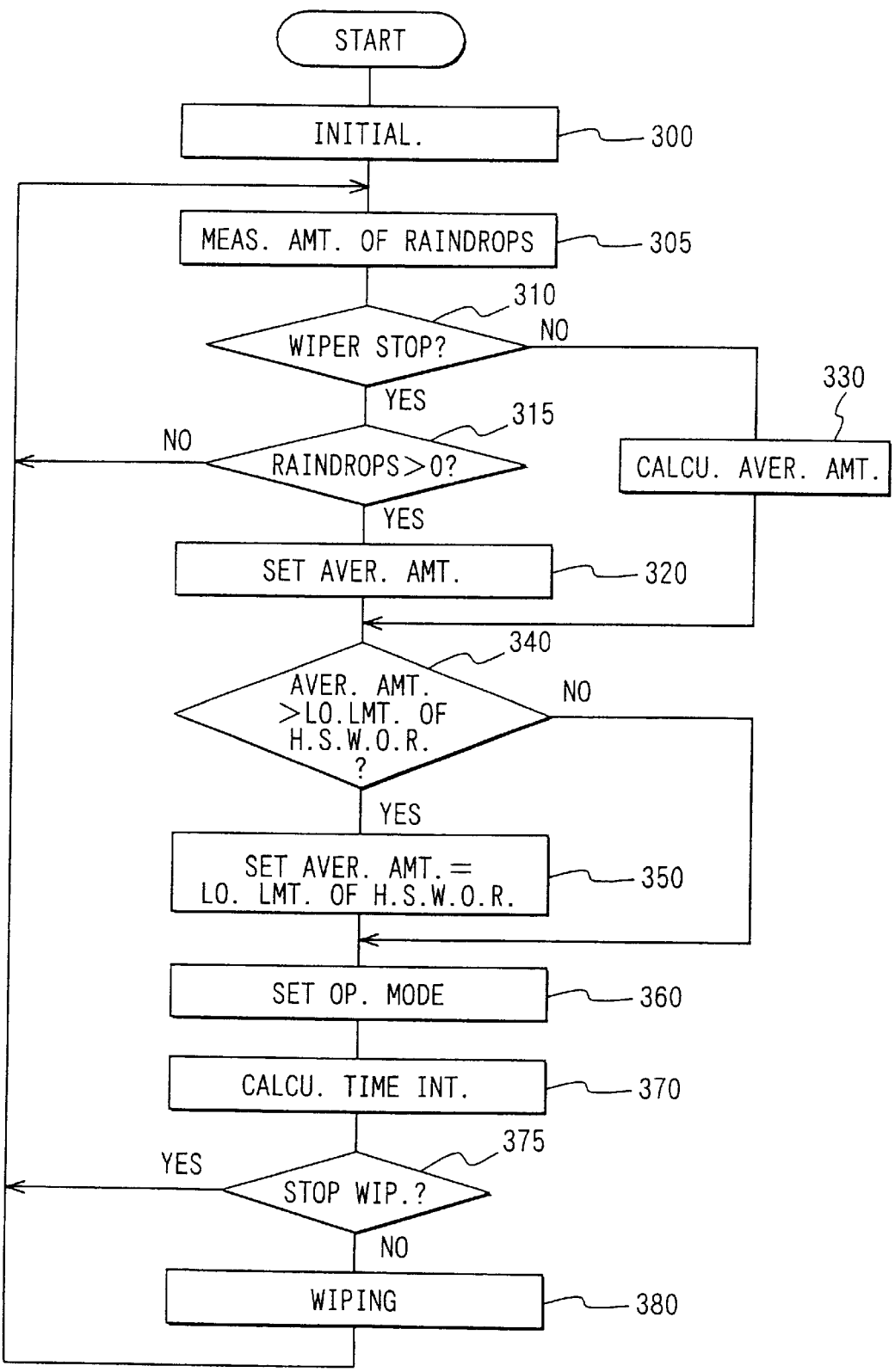
FIG. 4 is a flow chart showing operation of a wiper control system according to a second embodiment of the present invention.

FIG. 4 shows a flow chart of a second embodiment of the present invention. In this example, the delay time interval of intermittent operation is prevented from becoming unnecessarily long at the start of rainfall. Furthermore, when heavy rain causes the moving average amount of raindrops to increase and the wipers W to operate at high speed, and then the rain suddenly decreases, low speed operation of the wipers W is rapidly resumed.

In the flow chart of FIG. 4, first, after performing initialization at step 300, the microcomputer 3 carries out raindrop measurement at step 305. Then, in the automatic operation mode, at step 310, it is determined whether the current operation mode is a wiper stop mode where the wipers W are stopped. When YES is returned at step 310, control proceeds to step 315 where it is determined whether there is a raindrop(s) on the glass. In this way, it is determined whether the raindrop sensor 1 has first detected the raindrop(s) at step 315. Here, when it is the initial raindrop detection, next, control proceeds to step 320. At step 320, the initial average amount of raindrops is set to a fixed value that is above the reference value SM (e.g., set to a value, such as SU2, in the second upper region U2). In the case of the initial raindrop detection, there is no previous data or measurement, which indicates the average amount of raindrops. Thus, the reference value SM could be normally used as the fixed value of the initial average amount of raindrops. However, in the second embodiment, the initial average amount of raindrops is set to the value within the second upper region U2, which is above the reference value SM.

As a result, as shown in FIG. 3, the moving average amount of raindrops is set to the fixed value in the second upper region U2, which is above the reference value SM. Thus, the number of the latest measurements, which is used in the next averaging calculation, is set to 8, which is smaller than 16 that is assigned to the reference value SM. Also, the delay time interval adjustment value is set to −30%. Consequently, the delay time interval of intermittent operation is prevented from becoming unnecessarily long at the start of rainfall. When it is determined that there is substantially no raindrop at step 315, control returns to step 305, and the series of steps is repeated until a raindrop(s) is detected while the wipers are stopped.

On the other hand, when it is determined that the current operation mode is not the wiper stop mode (i.e., when it is determined that high speed, low speed or intermittent operation is in progress) at step 310, control then proceeds to step 330. At step 330, an average amount of raindrops is calculated based on the corresponding number of the latest measurements, which is determined and set at the previous averaging calculation for calculating the average amount of raindrops. Then, control proceeds to step 340 where it is determined whether the current average amount of raindrops is greater than the lower limit value (LO. LMT.) of the high speed wiping operation range (H.S.W.O.R.), i.e., SU4 of the fourth upper region U4 set for the high speed wiping operation of the wiper W. When it is determined that the current average amount of raindrops is greater than the lower limit value of the high speed wiping operation range, control proceeds to step 350. At step 350, the current average amount of raindrops is changed to the lower limit value (i.e., SU4) of the high speed wiping operation range.

When it is determined that the current average amount of raindrops is equal to or less than the lower limit value (i.e., SU4) of the high speed wiping operation range, control proceeds to step 360 without modifying the current average amount of raindrops. At step 360, an operation mode of the wipers W is set to one of the high speed operation, the low speed operation and the intermittent operation based on the current average amount of raindrops. If the operation of the wipers W is set to the intermittent operation, control moves to step 370 where the delay time interval is calculated in a manner similar to that of the first embodiment. For example, when the current average amount of raindrops is in the upper first region U1, the delay time interval is reduced by 10% by applying the delay time interval adjustment value of −10%. When the current average amount of raindrops is in the upper second region U2, the delay time interval is reduced by 30% by applying the delay time interval adjustment value of −30%. Then, control moves to step 375 where it is determined whether the wipers W need to be stopped. Here, when the delay time interval is equal to or greater than a predetermined time interval (e.g., 12 seconds), it is determined that the wipers W need to be stopped, so that the operation is shifted to the wiper stop mode. On the other hand, when it is determined that the wipers W do not need to be stopped, control proceeds to step 380 where the wipers W are operated based on the computed delay time interval. Then, control returns from step 380 to step 305 to repeat the above process. Here, step 320 corresponds to an initial average amount setting means for setting a fixed value as an initial average amount of raindrops. Steps 330 and 350 correspond to the average amount calculating means of the present invention. Step 370 corresponds to the delay time interval calculating means of the present invention. Furthermore, steps 375 and 380 correspond to the wiper control means of the present invention.

As described above, by setting the average amount of raindrops to the fixed value in the second upper region U2 above the reference value SM, the number of the latest measurements used in the next averaging calculation is set to 8, which is smaller than 16 that is assigned to the reference value SM, and the delay time interval adjustment value is set to −30%, which allows reduction of the delay time interval. As a result, the delay time interval is prevented from becoming unnecessarily long at the start of rainfall, and wiping delay can thus be substantially eliminated to ensure good vision. When the rain is heavy, and thus the current average amount of raindrops exceeds the lower limit value (i.e., SU4) of the high speed wiping operation range to cause the high speed operation of the wipers W, the current average amount of raindrops is changed to the lower limit value (i.e., SU4) of the high speed wiping operation range. Thus, when a vehicle traveling in heavy rain enters a tunnel, the high speed operation of the wipers W can be quickly shifted to intermittent operation without giving the driver a disconcerting feeling. Furthermore, since there is no high speed operation of the wipers W when there is little rain deterioration, for example, in the tunnel, wearing of the wiper blades can be advantageously restrained.

As described above, with the wiper control system of the invention, when rainfall suddenly increases or decreases, the predetermined number of the latest measurements is reduced, and an average amount of raindrops is calculated based on the reduced number of the latest measurements. Consequently, the delay time interval is determined based on the average amount of raindrops, which is closer to the actual amount of raindrops. Thus, the response of the wiping operation of the wipers to a change in the rainfall is improved, and the disadvantage of the delay time interval of the wipers, which fluctuates repeatedly during sharp changes in rainfall, can be ameliorated.

Furthermore, with the wiper control system of the invention, when rainfall suddenly becomes heavy, and thus the calculated average amount of raindrops deviates from the predetermined reference average amount of raindrops to the plus side (in a range above the predetermined reference average amount of raindrops), the delay time interval is calculated shorter as the difference between the average amount of raindrops and the reference average amount of raindrops becomes greater. Furthermore, when rainfall suddenly becomes light, and thus the calculated average amount of raindrops deviates from the reference value (i.e., the predetermined reference average amount of raindrops) to the minus side (in a range below the reference average amount of raindrops), the delay time interval is calculated longer as the difference between the average amount of raindrops and the reference value becomes greater. As a result, the delay time interval of the wipers W is set shorter or longer in correspondence with sudden increasing and decreasing of the amount of raindrops, and it is possible to perform wiping with swift response to changes in the actual rainfall.

Also, with the wiper control system of the invention, at the time of the initial or first raindrop detection after the automatic operation mode is initiated, the fixed value at a level above the reference value is set as the initial average amount of raindrops. Thus, even when rainfall has just started, and thus the amount of raindrops is small, the wiper speed is controlled to slightly high or the delay time interval is shortened. As a result, raindrops on the window glass are rapidly wiped off, and wiping delay of the wipers, which otherwise tends to occur at the start of rainfall, can be prevented.

Furthermore, with the wiper control system of the invention, when the calculated average amount of raindrops exceeds the lower limit value of the high speed wiping operation range, the calculated average amount of raindrops is set to the lower limit value of the high speed wiping operation range to cut the amount of raindrops above the lower limit value of the high speed wiping operation range. Consequently, when the amount of raindrops suddenly falls, a shift to low speed wiping or intermittent operation with a relatively long delay time interval can be made rapidly, and the driver is not given a disconcerting feeling, and wearing of the wipers can be restrained.

In the above embodiments, the measurement signal of the raindrop sensor 1 is sampled at the end of each OFF period (indicated with OFF in FIG. 3) of the wiper W. However, the measurement signal of the raindrop sensor 1 can be sampled at any predetermined time in each wiping period of the wiper. For example, the measurement signal of the raindrop sensor 1 can be sampled when an ON signal is supplied to the wiper motor 5 to drive the wipers W. In such a case, the measurement signal should be sampled before the corresponding wiper W reaches the raindrop sensor 1 in each wiping period.

Additional advantages and modifications will readily occur to those skilled in the art. The invention in its broader terms is therefore, not limited to the specific details, representative apparatus, and illustrative examples shown and described.

What is claimed is:

1. A wiper control system comprising:
   a wiper for wiping off raindrops landed on a window glass;
   a sensing means for taking a measurement of an amount of raindrops present in a predetermined area of the window glass at a predetermined time in each wiping period of the wiper, wherein the sensing means is disposed in a wiping range of the wiper on the window glass;
   an average amount calculating means for calculating an average amount of raindrops in each wiping period of the wiper by averaging a predetermined number of the latest measurements measured with the sensing means; and
   a wiper control means for controlling operation of the wiper based on the average amount of raindrops, which is calculated by the average amount calculating means.

2. A wiper control system according to claim 1, wherein the average amount calculating means decreases the predetermined number of the latest measurements, which is used for calculating the average amount of raindrops in the current wiping period of the wiper, if the difference between the last calculated average amount of raindrops, which is calculated in the previous wiping period of the wiper, and a predetermined reference average amount of raindrops increases.

3. A wiper control system according to claim 2, wherein the average amount calculating means decreases the predetermined number of the latest measurements in a stepwise manner if the difference between the last calculated average amount of raindrops and the predetermined reference average amount of raindrops increases.

4. A wiper control system according to claim 1, further comprising a delay time interval calculating means for calculating a next delay time interval of the wiper based on the current calculated average amount of raindrops, which is calculated by the average amount calculating means, wherein the wiper control means operates the wiper based on the calculated delay time interval, which is calculated by the delay time interval calculating means.

5. A wiper control system according to claim 4, wherein:
   If the difference between the current calculated average amount of raindrops and a predetermined reference average amount of raindrops increases in a range above the predetermined reference average amount of raindrops, the delay time interval calculating means decreases the calculated next delay time interval; and
   if the difference between the current calculated average amount of raindrops and the predetermined reference average amount of raindrops increases in a range below the predetermined reference average amount of raindrops, the delay time interval calculating means increases the calculated next delay time interval.

6. A wiper control system according to claim 4, further comprising an initial average amount setting means for setting a fixed value, which is above a predetermined reference average amount of raindrops, as an initial average amount of raindrops when the sensing means senses raindrops landed on the window glass first time after an automatic wiping operation of the wiper is initiated.

7. A wiper control system according to claim 1, wherein the average amount calculating means changes the current calculated average amount of raindrops to a lower limit value of a high speed wiping operation range set for high speed wiping operation of the wiper when the current calculated average amount of raindrops is above the lower limit value of the high speed wiping operation range.

8. A method for controlling a wiper, which wipes off raindrops landed on a window glass, the method comprising:

taking a measurement of an amount of raindrops present in a predetermined area of the window glass at a predetermined time in each wiping period of the wiper;

calculating an average amount of raindrops in each wiping period of the wiper by averaging a predetermined number of the latest measurements; and controlling operation of the wiper based on the average amount of raindrops.

9. A method according to claim 8, wherein the calculating of the average amount of raindrops includes decreasing the predetermined number of the latest measurements, which is used for calculating the average amount of raindrops in the current wiping period of the wiper, if the difference between the last calculated average amount of raindrops, which is calculated in the previous wiping period of the wiper, and a predetermined reference average amount of raindrops increases.

10. A method according to claim 9, wherein the decreasing of the predetermined number of the latest measurements is performed in a stepwise manner.

11. A method according to claim 8, further comprising calculating a next delay time interval of the wiper based on the current calculated average amount of raindrops, wherein the controlling of the wiper is performed based on the calculated delay time interval.

12. A method according to claim 11, wherein the calculating of the next delay time interval of the wiper includes:

decreasing the calculated next delay time interval if the difference between the current calculated average amount of raindrops and a predetermined reference average amount of raindrops increases in a range above the predetermined reference average amount of raindrops; and increasing the calculated next delay time interval if the difference between the current calculated average amount of raindrops and the predetermined reference average amount of raindrops increases in a range below the predetermined reference average amount of raindrops.

13. A method according to claim 11, further comprising setting a fixed value, which is above a predetermined reference average amount of raindrops, as an initial average amount of raindrops when raindrops landed on the window glass is sensed first time after an automatic wiping operation of the wiper is initiated.

14. A method according to claim 8, wherein the calculating of the average amount of raindrops includes changing the current calculated average amount of raindrops to a lower limit value of a high speed wiping operation range set for high speed wiping operation of the wiper when the current calculated average amount of raindrops is above the lower limit value of the high speed wiping operation range.

* * * * *